United States Patent
Giamati (12)

(10) Patent No.: US 12,297,919 B2
(45) Date of Patent: May 13, 2025

(54) FAUCET WITH INTERNAL DAMPER

(71) Applicant: Goodrich Corporation, Charlotte, NC (US)

(72) Inventor: Nicholas Giamati, Akron, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 18/363,905

(22) Filed: Aug. 2, 2023

(65) Prior Publication Data

US 2024/0263713 A1     Aug. 8, 2024

Related U.S. Application Data

(60) Provisional application No. 63/483,810, filed on Feb. 8, 2023.

(51) Int. Cl.
| | |
|---|---|
| *F16K 21/06* | (2006.01) |
| *F16K 11/00* | (2006.01) |
| *F16K 11/074* | (2006.01) |
| *F16K 21/10* | (2006.01) |
| *F16K 31/44* | (2006.01) |

(52) U.S. Cl.
CPC ............ *F16K 21/06* (2013.01); *F16K 11/074* (2013.01); *F16K 19/006* (2013.01); *F16K 21/10* (2013.01); *F16K 31/44* (2013.01)

(58) Field of Classification Search
CPC ...... F16K 21/06; F16K 11/074; F16K 19/006; F16K 21/10; F16K 31/44
USPC .......................................................... 137/801
See application file for complete search history.

(56) References Cited

U.S. PATENT DOCUMENTS

| | | |
|---|---|---|
| 4,457,452 A | 7/1984 | Symmons |
| 5,427,351 A | 6/1995 | Korfgen et al. |
| 5,893,387 A * | 4/1999 | Paterson ............... E03C 1/0401 |
| | | 137/359 |
| 6,286,533 B1 | 9/2001 | Goncze |

(Continued)

FOREIGN PATENT DOCUMENTS

| | | |
|---|---|---|
| DE | 7212321 U | 6/1972 |
| EP | 2674651 A1 | 12/2013 |

(Continued)

OTHER PUBLICATIONS

European Search Report issued in European Application No. 24156393.1 dated Jun. 25, 20224; 10 pages.

*Primary Examiner* — John Bastianelli
(74) *Attorney, Agent, or Firm* — CANTOR COLBURN LLP (57) ABSTRACT

A faucet having a body extending from forward to aft ends to define a body cavity, the body includes an aft wall having faucet inlet ports, and a faucet outlet between the forward and aft ends; a push knob coupled to the body forward end; a cartridge fixed within the body cavity, the cartridge has a cartridge cavity with an aft seal seat, a cartridge outlet port forward of the aft seal seat, and a cartridge inlet port aft of the aft seal seat; a piston within the cartridge cavity, defining an aft seal lip: the piston is movable by the push knob from first to second positions, to move the lip and open the faucet; and the piston moves from the second to the first positions, to position the lip against the aft seal seat and close the faucet; and a linear damper, mounted to the body forward end.

19 Claims, 8 Drawing Sheets

(56) References Cited

U.S. PATENT DOCUMENTS 7,533,683 B2 * 5/2009 Ortega ................ F16K 19/006
137/454.6
8,555,922 B2 10/2013 Migliore et al.

FOREIGN PATENT DOCUMENTS

| EP | 2998622 | A1 | 3/2016 |
| EP | 4043764 | A1 | 8/2022 |
| FR | 2120893 | A5 | 8/1972 |
| FR | 2509007 | A1 | 1/1983 |

* cited by examiner

FAUCET WITH INTERNAL DAMPER

CROSS-REFERENCE TO RELATED APPLICATIONS

This application claims the benefit of priority to U.S. Application No. 63/483,810 filed Feb. 8, 2023, the disclosure of which is incorporated herein by reference in its entirety.

BACKGROUND

The embodiments are directed to faucets and more specifically to a faucet with an internal damper.

Faucets that utilize a push-knob type of actuator may have a limited ability for adjusting a return timing of the push-knob to shut of the faucet. Timing may be a function of pressure and temperature, which may be variable. The timing control implements may be subject to water flow, which may therefore be subject to mineral deposits and corrosion.

SUMMARY OF THE EMBODIMENTS

Disclosed is a faucet including: a body, extending from a forward end to an aft end to define a body cavity, wherein the body includes an aft wall that defines faucet inlet ports, and the body defines a faucet outlet between the forward and aft ends; a push knob, operationally coupled to the forward end of the body; a cartridge, fixed within the body cavity, wherein the cartridge defines a cartridge cavity that has an aft seal seat, a cartridge outlet port that is forward of the aft seal seat, and a cartridge inlet port that is aft of the aft seal seat; a piston that is seated within the cartridge cavity, the piston defining an aft seal lip, wherein: the piston is movable by the push knob from a first position to a second position, to move the lip away from the seal seat and open the faucet; and the piston is movable by a spring from the second position to the first position, to position the lip against the aft seal seat and close the faucet; and a linear damper, mounted to the forward end of the body, wherein the linear damper engages the piston to dampen movement of the piston from the second position to the first position.

In addition to one or more aspects of the faucet, or as an alternate, the aft seal lip defines an aft seal seat.

In addition to one or more aspects of the faucet, or as an alternate, the cartridge extends from an aft end to a forward end, the aft end of the cartridge is aft of the faucet outlet and the forward end of the cartridge is forward of the faucet outlet; and the cartridge defines: an aft seal seat that faces the body is between the aft end of the cartridge and the cartridge outlet port; and a forward o-ring groove that faces the body is between the forward end of the cartridge and the cartridge outlet port.

In addition to one or more aspects of the faucet, or as an alternate, the piston extends from an aft end that defines the aft seal lip to a forward end that extends forward of the forward end of the cartridge; and the cartridge defines an inner-facing forward o-ring groove that faces the piston and is between the forward end of the cartridge and the cartridge outlet port.

In addition to one or more aspects of the faucet, or as an alternate, the forward end of the piston defines a forward piston cavity that extends aft to a location that is intermediate the forward and aft ends of the piston; and the linear damper extends from a forward end that extends forward of the forward end of the body to an aft end that extends into the forward piston cavity, and the damper includes a plunger extending aft from the aft end of the damper to engage the piston.

In addition to one or more aspects of the faucet, or as an alternate, the forward end of the piston is non-circular; and the faucet includes a stub shaft extending between: a forward end that is connected to the push knob; and an aft end that defines a ring portion having an inner surface that is shaped to receive the forward end of the piston, whereby pushing the push knob moves the piston, and turning the push knob turns the piston.

In addition to one or more aspects of the faucet, or as an alternate, the faucet includes a compression spring that extends from the aft end of the stub shaft to the forward end of the cartridge to bias the stub shaft and the push knob toward the first position.

In addition to one or more aspects of the faucet, or as an alternate, the faucet includes a c-clip that is disposed on the piston, forward of the aft end of the stub shaft, whereby movement of the stub shaft from the second position to the first position moves the piston from the second position to the first position.

In addition to one or more aspects of the faucet, or as an alternate, the damper extends from a forward end to an aft end, and the forward end of the damper is threaded; and the faucet further includes a cup shaped damper mount that defines: a forward base having a center threaded aperture for engaging the forward end of the damper; and a cylindrical wall extending aft from the forward base, wherein the cylindrical wall is fixed to the forward end of the body, forward of the cartridge.

In addition to one or more aspects of the faucet, or as an alternate, the faucet includes a locknut, threaded to the forward end of the damper, against the damper mount, wherein adjusting the locknut shifts the damper forward or aft within the faucet to adjust loading on the plunger of the damper.

In addition to one or more aspects of the faucet, or as an alternate, the base of the damper mount defines apertures, and the stub shaft defines legs that are spaced apart from each other and extend forward from the ring portion, through the apertures in the damper mount; and the faucet includes a forward ring connected to the legs of the stub shaft and the push knob, wherein the push knob is released from the forward ring to remove the push knob from the body, to thereby provide access to the locknut.

In addition to one or more aspects of the faucet, or as an alternate, the faucet includes a forward c-clip fixed at the forward end of the body, forward of the damper mount, and a forward bushing is between the forward c-clip and the damper mount, and a wave spring extending aft from the damper mount, and a bushing between the wave spring and the forward end of the cartridge, whereby the cartridge is biased against the aft wall of the body.

In addition to one or more aspects of the faucet, or as an alternate, the faucet further includes a valve plug disposed against the aft wall of the body and extending into the cartridge cavity, wherein rotating the piston, via rotating the push knob, rotates the valve plug, to modulate flow between the faucet inlet ports.

In addition to one or more aspects of the faucet, or as an alternate, the valve plug includes a forward stem; and the aft end of the piston defines an aft piston cavity that is fluidly separated from the forward piston cavity, and the stem of the valve plug extends into the aft piston cavity, wherein the aft piston cavity and the stem are shaped such that rotation of the piston rotates the valve plug.

In addition to one or more aspects of the faucet, or as an alternate, the valve plug defines a plug base and a plug body between the plug base and the stem, wherein the plug body is within the cartridge cavity, and defines an outer o-ring groove that faces the cartridge.

In addition to one or more aspects of the faucet, or as an alternate, the faucet includes an aeration plug that is secured to the faucet outlet.

In addition to one or more aspects of the faucet, or as an alternate, the faucet includes a bleed plug disposed within the aft wall that is fluidly coupled to the faucet inlet ports and removable from the aft wall to bleed the faucet inlet ports.

In addition to one or more aspects of the faucet, or as an alternate, the aft end of the body includes: a backplate; and forward and aft gaskets that are forward and aft of the backplate, wherein: the backplate defines first and second apertures for receiving terminal ends of feed lines that are connected to the faucet inlet ports; and the backplate is mountable between the aft wall of the body and an exterior structure.

In addition to one or more aspects of the faucet, or as an alternate, the damper is a solenoid or mechanically adjustable.

In addition to one or more aspects of the faucet, or as an alternate, the faucet includes an outer cover is secured to the body, the outer cover defines a cutout to position the outer cover around the faucet outlet.

BRIEF DESCRIPTION OF THE DRAWINGS

The present disclosure is illustrated by way of example and not limited in the accompanying figures in which like reference numerals indicate similar elements.

DETAILED DESCRIPTION

The embodiments are directed to a faucet 100 (FIG. 1) having a push knob 120 that is pushed inwardly, from a first position or forward position (FIG. 4) to a second position or aft position (FIG. 5), to move an internal piston 130 (FIG. 3) aft within the faucet 100 and open the faucet 100. The push knob 120 and piston 130, together, are biased outwardly, e.g., by a spring 140, from the second position to the first position, to close the faucet 100. A linear damper (or damper) 135 is fixed within the faucet 100, between the push knob 120 and the piston 130, and controls the movement of the piston 130 from the second position to the first position, to thereby control closing of the faucet 100.

Figure 1:
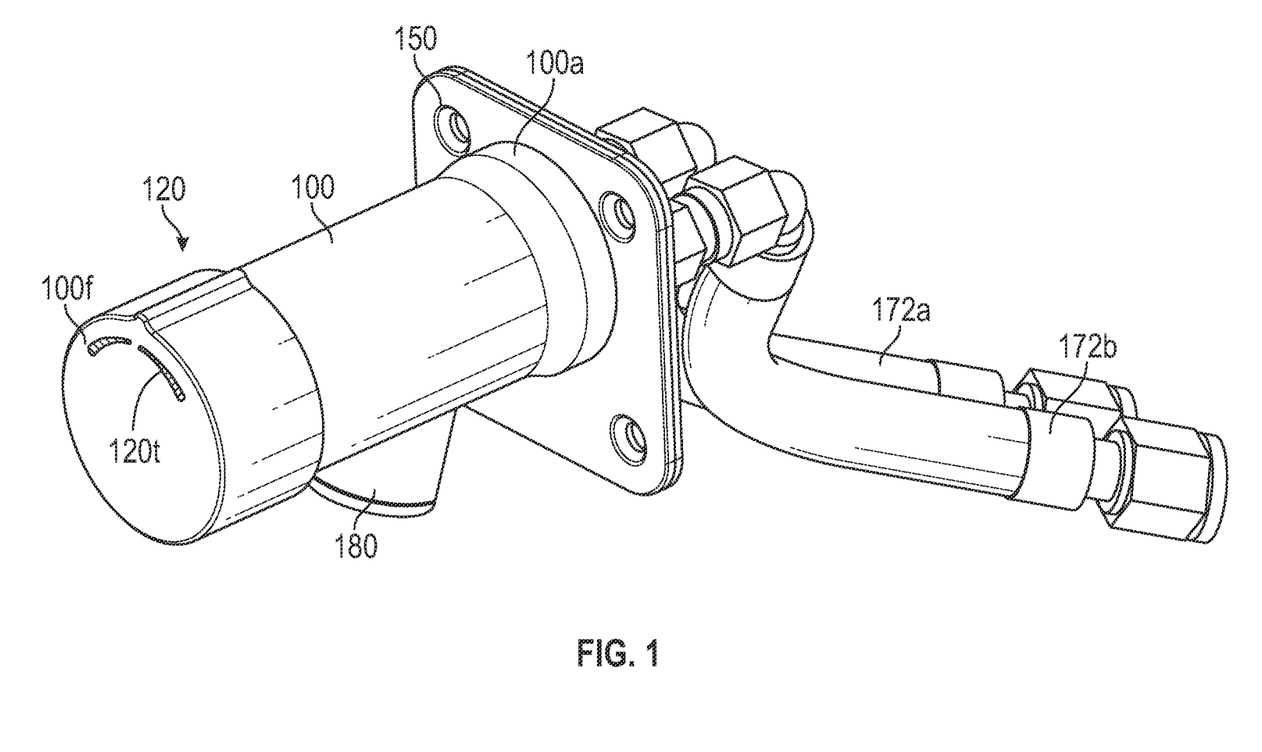
FIG. 1 is a perspective view of a faucet according to an embodiment.
Figure 2:
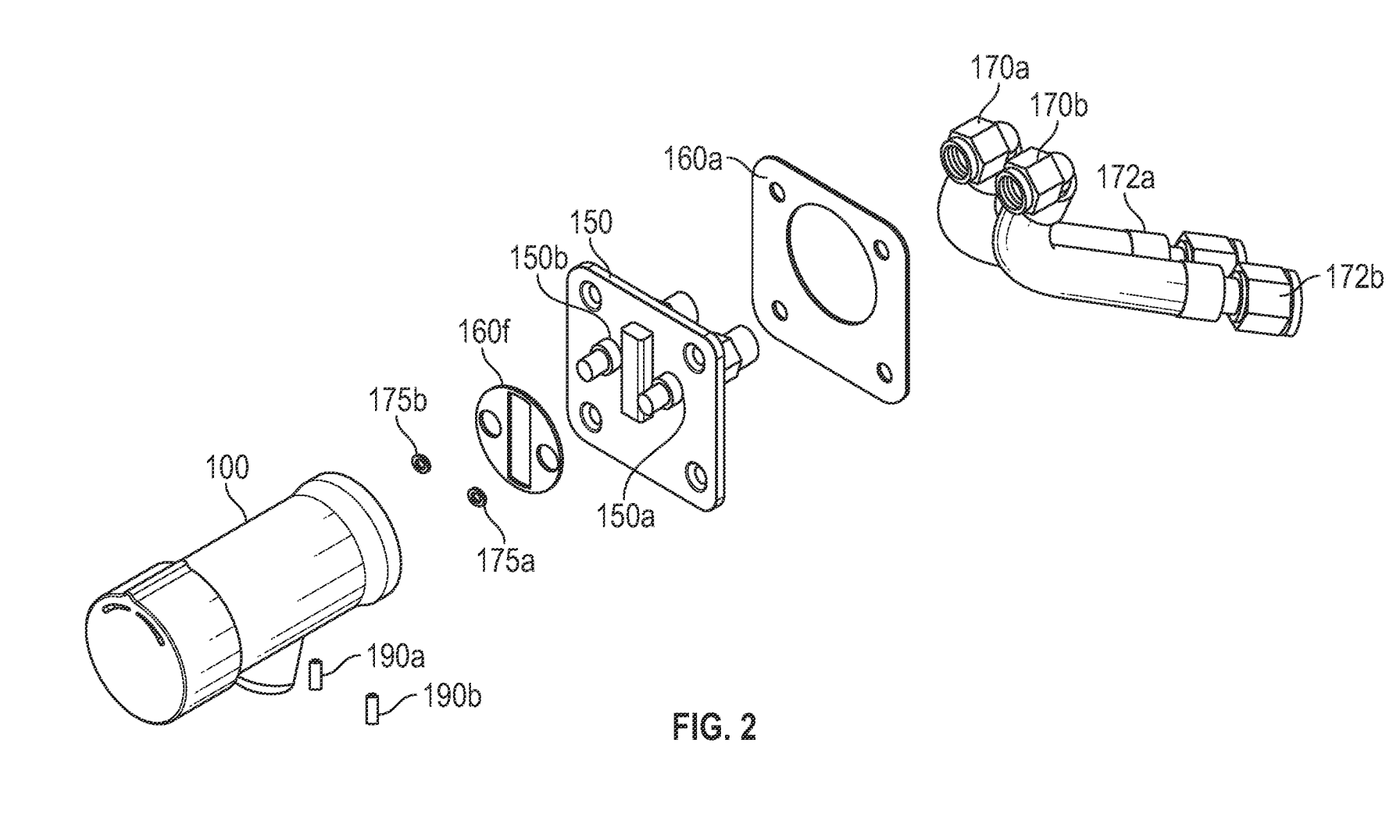
FIG. 2 is a perspective view of the faucet with feed lines disconnected from the faucet.

Turing to FIGS. 1-2, additional details about the faucet 100 are disclosed. The faucet 100 extends from forward to aft ends 100f, 100a. The aft end 100a of the faucet 100 includes a backplate 150 and forward and aft gaskets 160f, 160a that are forward and aft of the backplate 150. The backplate 150 defines first and second apertures 150a, 150b for receiving terminal ends 170a, 170b of the first and second feed lines 172a, 172b. The backplate 150 is mountable to an exterior structure, such as a structure of an aircraft. O-rings 175a, 175b may be placed on the terminal ends 170a, 170b. A faucet outlet 180 is located between the forward and aft ends 100f, 100a. Drain bleed plugs 190a, 190b are located in the aft end 100a of the faucet 100 for draining the feed lines 172a, 172b. The push knob 120 may have temperature control indicia 120t for modulating the outflow between hot and cold flows.

Figure 3:
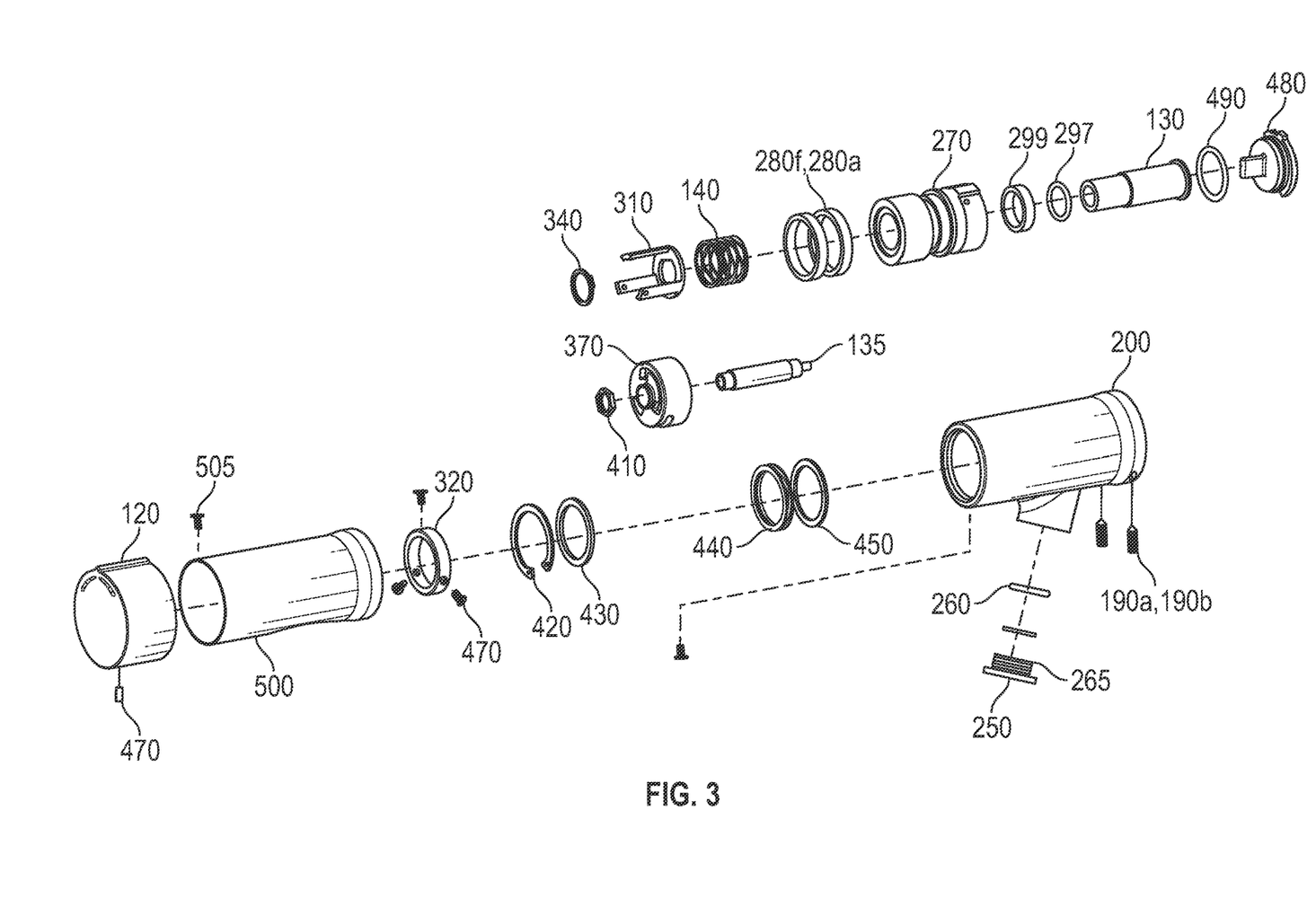
FIG. 3 is an exploded view of the faucet.
Figure 4A:
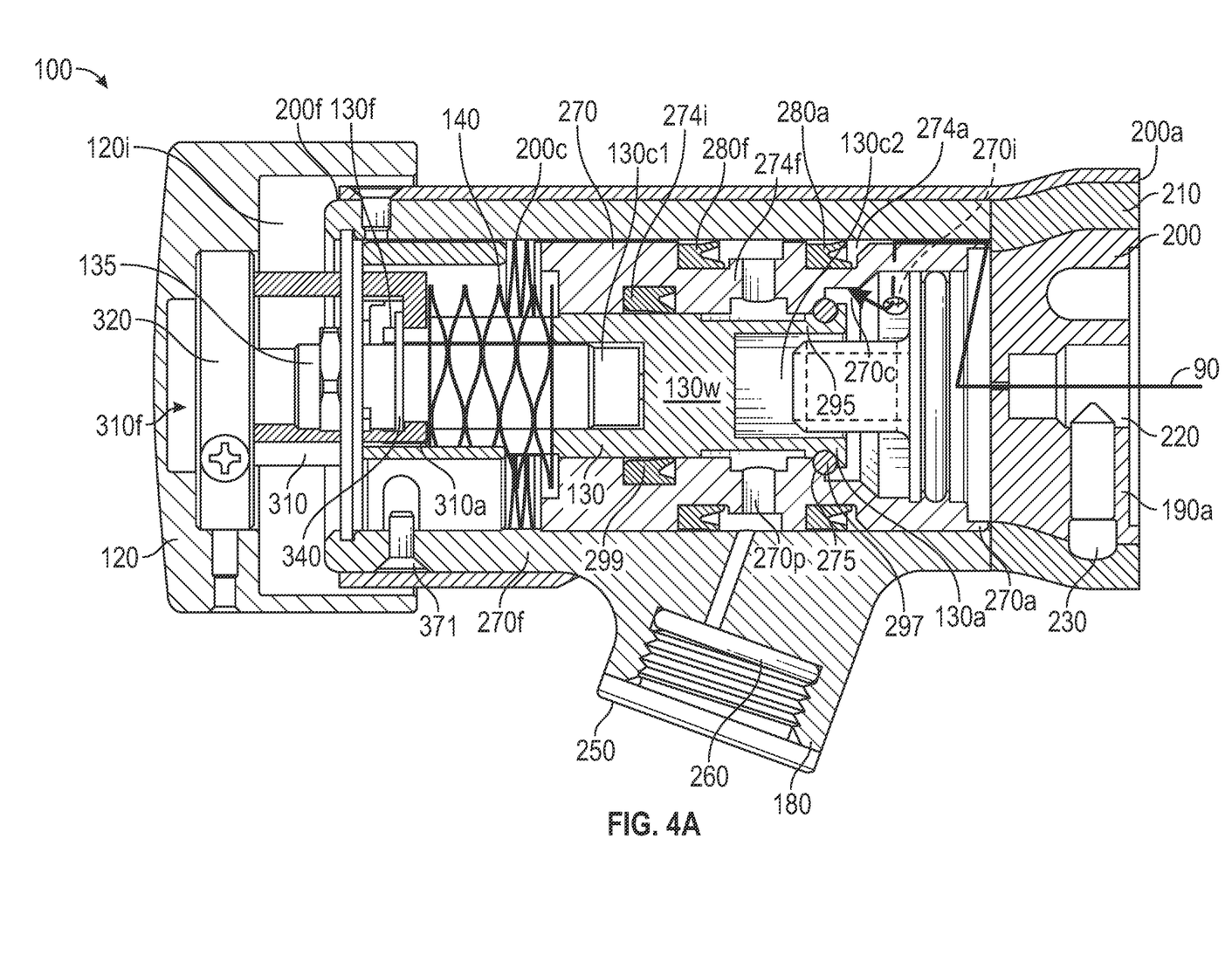
FIG. 4a is a side view of the cross section of the faucet, with faucet in a closed state.
Figure 4B:
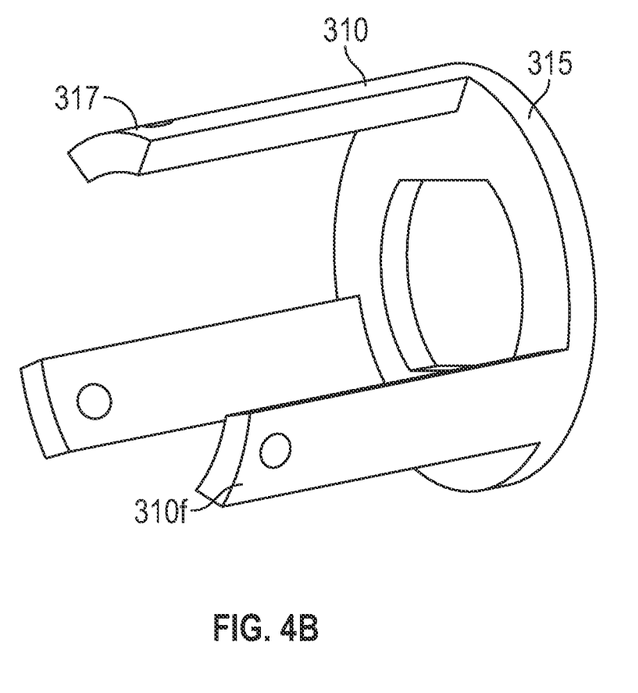
FIG. 4b shows a stub shaft that is within the faucet.

Turning to FIGS. 3-4a the faucet 100 includes a body 200 that extends from a forward end 200f to an aft end 200a. The aft end 200a of the body 200 includes an aft wall 210 that defines faucet inlet ports 220 (one shown) that are configured to receive flow from the feed lines 172a, 172b. Bleed ports 230 (one shown), which are threaded to receive the bleed plugs 190a, 190b, are defined in the aft wall 210. Forward of the aft end 200a, the body 200 is hollow to define a body cavity 200c. The faucet outlet 180 is defined between the forward and aft ends 200f, 200a. An aeration plug 250 is secured to the faucet outlet 180. An o-ring 260 is disposed at an inner side 250a of the aeration plug 250. A filter disk 265 is between the o-ring 260 and the aeration plug 250.

The faucet 100 includes a cartridge 270 that extends from a forward end 270f to an aft end 270a and is hollow to define a cartridge cavity 270c. The cartridge 270 is disposed within the body cavity 200c, against the aft wall 210 of the body 200. The cartridge 270 defines a cartridge inlet port 270i and a cartridge outlet port 270p, both being sidewall ports extending radially though the cartridge 270. With these ports, the cartridge cavity 270c of the cartridge 270 defines a flow path through the faucet 100, between the faucet inlet ports 220 and the faucet outlet 180. Forward and aft outer ring seals 280f, 280a, or wiper seals, are disposed between the cartridge 270 and the body 200, forward and aft of the cartridge outlet port 270p. The cartridge 270 defines forward and aft o-ring grooves 274f, 274a, that face the body 200 and are forward and aft of the cartridge outlet port 270p to seat the outer ring seals 280f, 280a. The aft groove 274a is between the cartridge outlet port 270p and the cartridge inlet port 270i. A cartridge aft seal seat 275 is provided in the cartridge cavity 270c and located between the cartridge inlet and outlet ports 270i, 270p. Additional aspects of the cartridge aft seal seat 275 are discussed below.

Figure 5A:
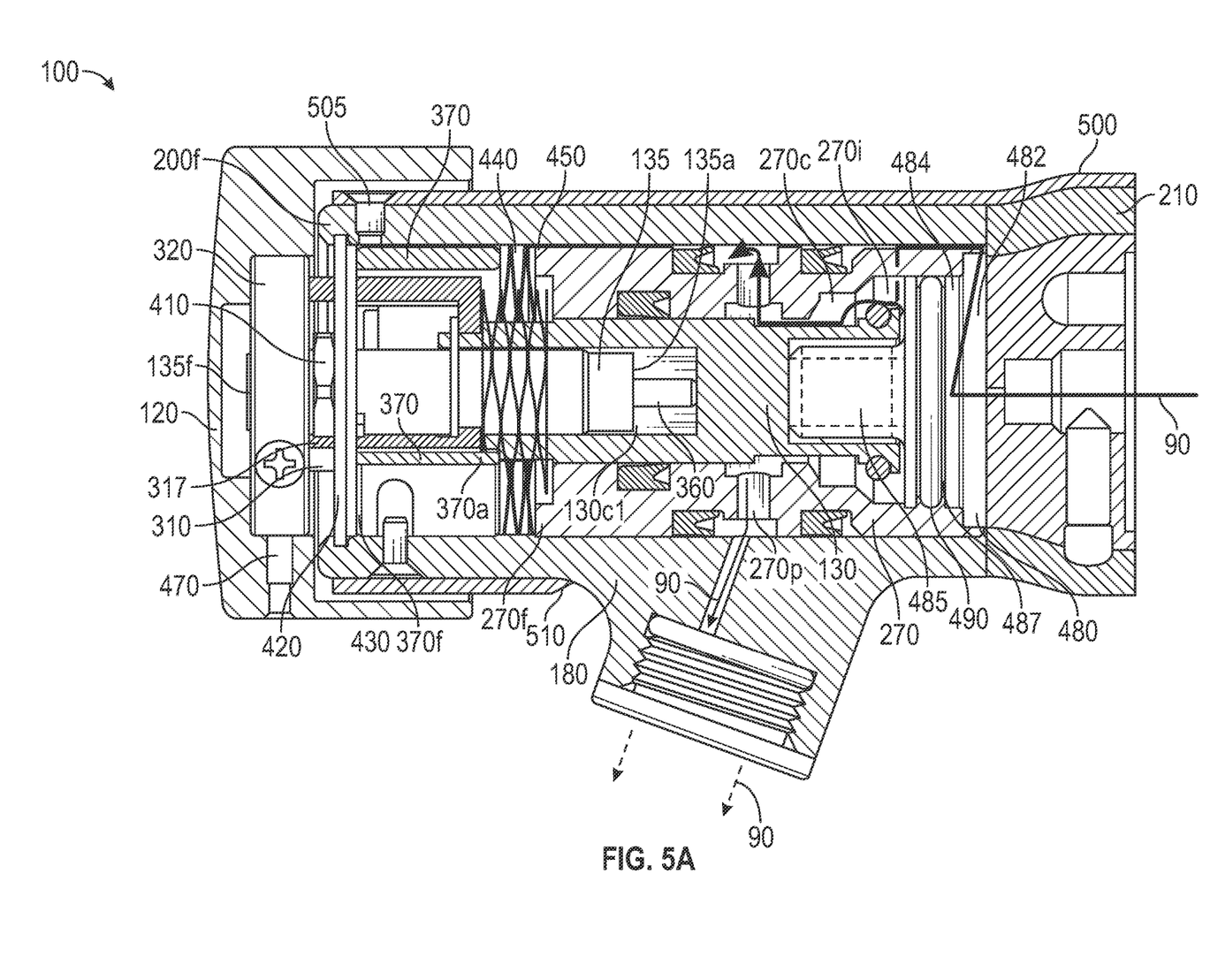
FIG. 5a is a side view of the cross section of the faucet, with faucet in an opened state.
Figure 5B:
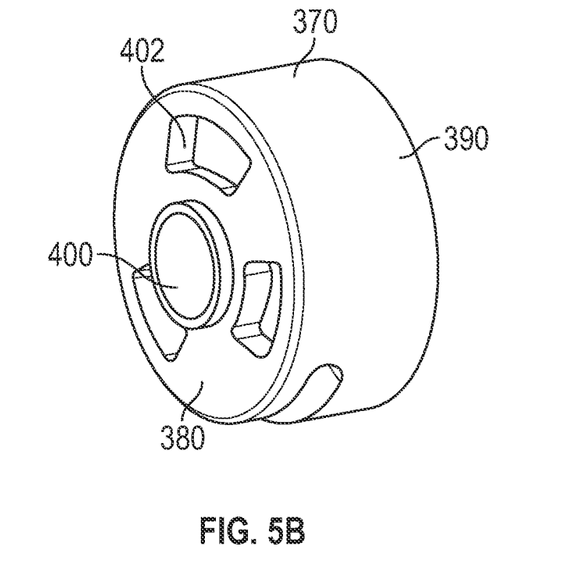
FIG. 5b shows a damper mount that is within the faucet.

The faucet 100 includes a piston 130 extending from a forward end 130f to an aft end 130a. The piston 130 is seated within the cartridge cavity 270c. The piston 130 includes a forward piston cavity 130c1 and an aft piston cavity 130c2 that are separate from each other, and an aft seal lip 295 that seats an o-ring 297. That is, an inner wall 130w separates the piston cavities 130c1, 130c2, and the inner wall 130w is located at an intermediate position along the piston 130. The forward end 130f of the piston 130 is forward of the forward end 270f of the cartridge 270 and aft of the forward end 200f of the body 200. An inner ring seal 299, or wiper seal, is disposed between the cartridge 270 and the piston 130, forward of the cartridge outlet port 270p. The cartridge 270 defines an inner-facing forward o-ring groove 274i that faces the piston 130 and is between the forward end 270f of the cartridge 270 and the cartridge outlet port 270p. The piston 130 is configured to move within the cartridge between a first position (FIG. 4a), when the o-ring 297 is against the cartridge aft seal seat 275 and the faucet 100 is closed, and a second position (FIG. 5a), when the o-ring 297 away from the cartridge aft seal seat 275 and the faucet 100 is opened. That is, fluid 90 can flow into the cartridge inlet port 270i and into the cartridge cavity 270c when the faucet 100 is closed, but the fluid cannot flow past the o-ring 297 and flow to the cartridge outlet port 270p. This prevents flow from leaving the faucet 100. In comparison, as shown in FIG. 5a, when the piston 130 is in the second position, the o-ring 297 is spaced apart from the cartridge aft seal seat 275 in the cartridge cavity 270c, and the flow path via the cartridge 270 is unsealed. Fluid 90 can flow around the piston 130 and through the faucet outlet 180.

The push knob 120 is cup shaped and seated around the forward end 200f of the body 200. The push knob 120 is fixed to the piston 130, as discussed in greater detail below, and moves the piston 130 between the first position and the second position. In the first position (FIG. 4a), an inner surface 120i of the push knob 120 is spaced apart from the forward end 200f of the body 200. In the second position (FIG. 5a), the inner surface 120i of the push knob 120 is adjacent to or against the forward end 200f of the body 200.

A stub shaft 310 (also shown in FIG. 4b) extends from a forward end 310f to an aft end 310a. The aft end 310a of the stub shaft 310 defines a ring portion 315 that is keyed to receive the forward end 130f of the piston 130. As such, the forward end 200f of the piston 130 may have a non-circular cross section. The forward end 310f of the stub shaft 310 is connected to a forward ring 320 (also shown in FIG. 6), which is connected to the inner surface 120i of the push knob 120. The inner surface 120i of the push knob 120 is keyed to receive the forward ring 320. As such, at least a portion 320p (FIG. 6) of the forward ring 320 may have a non-circular shape. From this configuration, turning the push knob 120 turns the piston 130 to modulate the flow temperature as discussed in greater detail below.

The compression spring 140, which may be a wave spring, extends from the aft end 310a of the stub shaft 310 to the forward end 270f of the cartridge 270 to bias the stub shaft 310 and push knob 120 from the second position toward the first position. A c-clip 340 is disposed around the forward end 270f of the piston 130, forward of the aft end 310a of the stub shaft 310. With the c-clip 340, movement of the stub shaft 310 from the second position to the first position moves the piston 130 from the second position to the first position.

Turning to FIGS. 3 and 5a, the damper 135 extends from a forward end 135f to an aft end 135a. The damper 135 extends into the forward piston cavity 130c1 of the piston 130. A plunger 360 extends aft from the aft end 135a of the damper 135. The damper 135 may be a solenoid, electrically powered, or may be hydraulic.

A damper mount 370 is fixed within the forward end 200f of the body 200, forward of the cartridge 270, e.g. via a set screw 371. The damper mount 370 extends from a forward end 370f to an aft end 370a, is cup shaped to define a base 380 (FIG. 5b) at the forward end 370f and a cylinder portion 390 that extends to the aft end 370a. The base 380 defines a center aperture 400 that is threaded for engaging the forward end 135f of the damper 135. The damper 135 is fixed within the faucet 100 via the damper mount 370. With this configuration, the plunger 360 engages the piston 130 and dampens linear motion of the piston 130 moving between the second and first positions.

Figure 6:
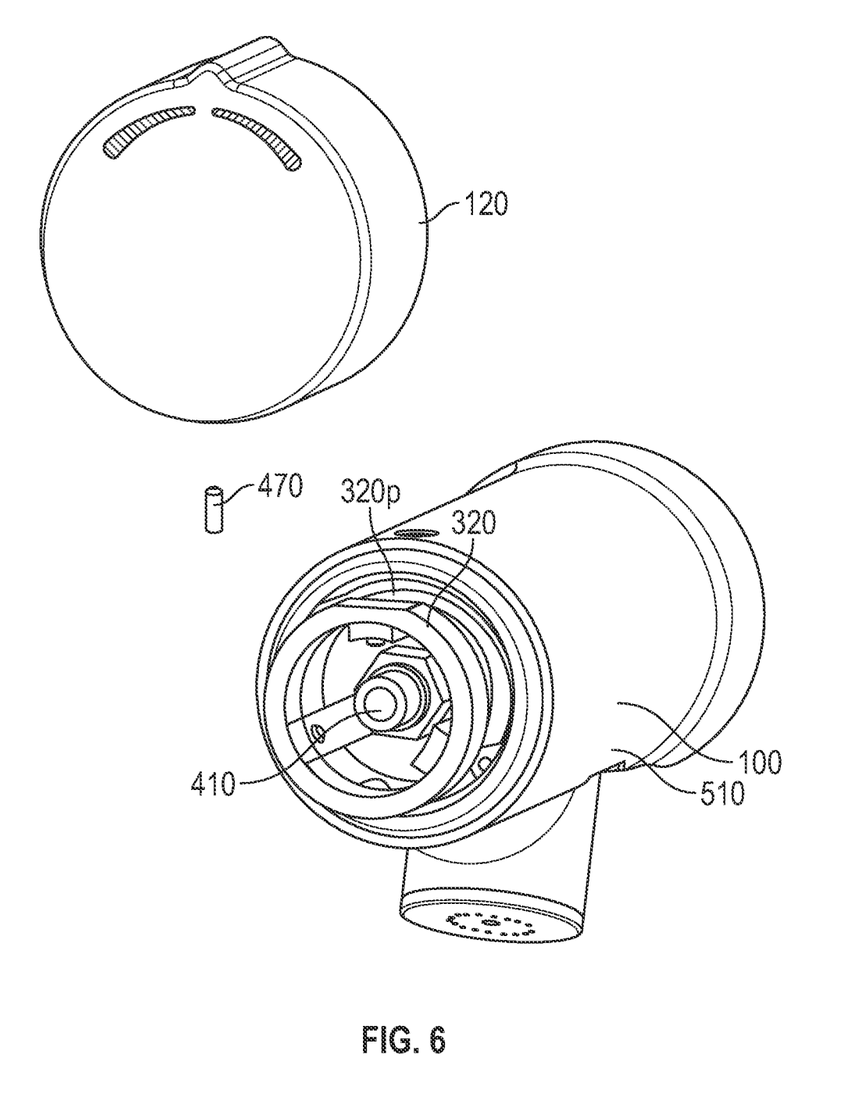
FIG. 6 shows the push knob removed from the faucet to expose a damper adjustment nut.

A locknut 410 is threaded to the forward end 135f of the damper 135, against the base 380 of the damper mount 370. The locknut 410 may be engaged by removing the push knob 120 (FIG. 6). Adjusting the locknut 410 shifts the damper 135 forward or aft to adjust loading on the damper plunger 360.

A forward c-clip 420 is located at the forward end 200f of the body 200, forward of the damper mount 370. The forward c-clip 420 prevents the damper mount 370 from moving forward of the forward end 200f of the body 200. A bushing 430 that may be plastic is located between the forward c-clip 420 and the damper mount 370.

The aft end 370a of the damper mount 370 is spaced apart from the forward end 270f of the cartridge 270. An outer compression spring 440 that may be a wave spring is disposed between damper mount 370 and the cartridge 270. The spring 440 biases the cartridge 270 against the aft wall 210 of the body 200. An aft bushing 450 that may be bronze is located between the outer spring 440 and the cartridge 270.

The base 380 of the damper mount 370 defines circumferential apertures 402 (FIG. 5b) that are spaced apart from the center aperture 400 and each other. The stub shaft 310 defines leg portions 317 (FIG. 4b) extending forward of the ring portion 315 and are circumferentially spaced apart from each other. The leg portions 317 extend through the circumferential apertures 402 to engage the forward ring 320. That is, the forward ring 320 is connected to the leg portions 317 of the stub shaft 310 at the forward end 310f of the stub shaft 310. The forward ring 320 is releasably connected to the push knob 120. The push knob 120 is released from the forward ring 320 to remove the push knob 120 from the body 200. A set screw 470 may enable attaching and removing the push knob 120 to provide access to the locknut 410 for adjusting the damper 135.

Figure 5C:
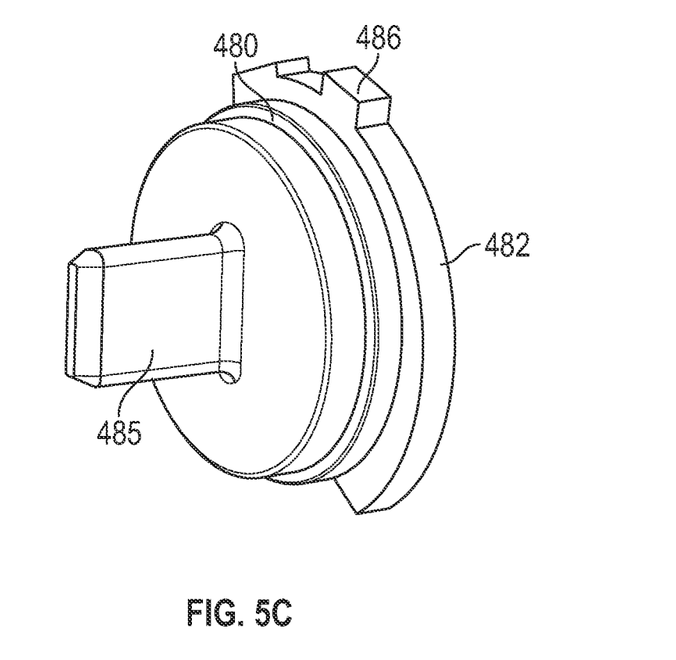
FIG. 5c shows a valve plug that is within the faucet.

A valve plug 480 is disposed against the aft wall 210, within the body cavity 200c, to define a plug base 482 and plug body 484 that extends into the cartridge cavity 270c. The valve plug 480 includes a forward stem 485 (FIG. 5C) that extends into the aft piston cavity 130c2. The aft piston cavity 130c2 and forward stem 485 are shaped in a such that rotation of the piston 130, from rotation of the push knob 120, rotates the valve plug 480. For example, the stem 485 may be shaped as a thin rectangular block. A shape of the plug base 482 is non-circular and may have rotation stops 486 (FIG. 5C). With this configuration, rotation of the valve plug changes a relative flow area from the feed lines 172a, 172b (FIG. 2) into the faucet 100, to modulate the flow temperature. A plug o-ring 490 is located around the valve plug body 484, between the plug base 482 and the stem 485, to prevent flow around the valve plug 480. The plug body 484 may define an outer o-ring groove 487 that faces the cartridge 270 and seats the plug o-ring 490.

As shown in FIGS. 3, 5a and 6, an outer cover 500 may secured around the body 200. The outer cover 500 may form a cutout 510 to position the outer cover 500 around the faucet outlet 180.

The above disclosed faucet 100 provides for access to a locknut 410 for adjustment of the damper 135. The design isolates the damper 135 from the water path 90 so that the damper 135 may be replaced and interchanged with another damper if there is a timing requirement outside of an adjustment range for an installed damper. The damper adjustment may be performed while the faucet 100 is connected to a water supply lines 172a, 172b. The damper 135 may be replaced with an electronic solenoid to provide electronic faucet functions.

Benefits of the disclosed faucet 100 is that only the push knob 120 needs to be removed to adjust the damper 135. The damper 135 is isolated from the water path 90 within the faucet 100. As a result, if damping fluid within the damper 135 were to leak, or any part the damper 135 were to break, the water 90 through the faucet 100 would not become contaminated. The damper may be able to be replaced for different timing and tuning. The damper is able to be adjusted without removing major components of the faucet body in the water flow path. The damper is able to be replaced as an electronic solenoid. In addition, the faucet 100 is capable of being drained by removing drain bleed plugs 190*a*, 190*b*.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A faucet comprising:
a body, extending from a forward end to an aft end to define a body cavity, wherein the body includes an aft wall that defines faucet inlet ports, and the body defines a faucet outlet between the forward and aft ends;
a push knob, operationally coupled to the forward end of the body;
a cartridge, fixed within the body cavity, wherein the cartridge defines a cartridge cavity that has an aft seal seat, a cartridge outlet port that is forward of the aft seal seat, and a cartridge inlet port that is aft of the aft seal seat;
a piston that is seated within the cartridge cavity, the piston defining an aft seal lip, wherein:
the piston is movable by the push knob from a first position to a second position, to move the lip away from the seal seat and open the faucet; and
the piston is movable by a spring from the second position to the first position, to position the lip against the aft seal seat and close the faucet; and
a linear damper, mounted to the forward end of the body, wherein the linear damper engages the piston to dampen movement of the piston from the second position to the first position;
the forward end of the piston defines a forward piston cavity that extends aft to a location that is intermediate the forward and aft ends of the piston; and
the linear damper extends from a forward end that extends forward of the forward end of the body to an aft end that extends into the forward piston cavity, and the damper includes a plunger extending aft from the aft end of the damper to engage the piston.

2. The faucet of claim 1, wherein the aft seal lip defines an aft seal seat.

3. The faucet of claim 2, wherein:
the cartridge extends from an aft end to a forward end, the aft end of the cartridge is aft of the faucet outlet and the forward end of the cartridge is forward of the faucet outlet; and
the cartridge defines: an aft seal seat that faces the body is between the aft end of the cartridge and the cartridge outlet port; and a forward o-ring groove that faces the body is between the forward end of the cartridge and the cartridge outlet port.

4. The faucet of claim 3, wherein:
the piston extends from an aft end that defines the aft seal lip to a forward end that extends forward of the forward end of the cartridge; and
the cartridge defines an inner-facing forward o-ring groove that faces the piston and is between the forward end of the cartridge and the cartridge outlet port.

5. The faucet of claim 1, wherein:
the forward end of the piston is non-circular; and
the faucet includes a stub shaft extending between: a forward end that is connected to the push knob; and an aft end that defines a ring portion having an inner surface that is shaped to receive the forward end of the piston, whereby pushing the push knob moves the piston, and turning the push knob turns the piston.

6. The faucet of claim 5, further comprising:
a compression spring that extends from the aft end of the stub shaft to the forward end of the cartridge to bias the stub shaft and the push knob toward the first position.

7. The faucet of claim 5, further comprising:
a c-clip that is disposed on the piston, forward of the aft end of the stub shaft, whereby movement of the stub shaft from the second position to the first position moves the piston from the second position to the first position.

8. The faucet of claim 5, wherein:
the damper extends from a forward end to an aft end, and the forward end of the damper is threaded; and
the faucet further includes a cup shaped damper mount that defines: a forward base having a center threaded aperture for engaging the forward end of the damper; and a cylindrical wall extending aft from the forward base, wherein the cylindrical wall is fixed to the forward end of the body, forward of the cartridge.

9. The faucet of claim 8, further comprising:
a locknut, threaded to the forward end of the damper, against the damper mount, wherein adjusting the locknut shifts the damper forward or aft within the faucet to adjust loading on the plunger of the damper.

10. The faucet of claim 9, wherein:
the base of the damper mount defines apertures, and the stub shaft defines legs that are spaced apart from each other and extend forward from the ring portion, through the apertures in the damper mount; and
the faucet includes a forward ring connected to the legs of the stub shaft and the push knob, wherein the push knob is released from the forward ring to remove the push knob from the body, to thereby provide access to the locknut.

11. The faucet of claim 8, further comprising:
a forward c-clip fixed at the forward end of the body, forward of the damper mount, and a forward bushing is between the forward c-clip and the damper mount, and a wave spring extending aft from the damper mount, and a bushing between the wave spring and the forward end of the cartridge, whereby the cartridge is biased against the aft wall of the body.

12. The faucet of claim 1, wherein:

the faucet further comprises a valve plug disposed against the aft wall of the body and extending into the cartridge cavity, wherein rotating the piston, via rotating the push knob, rotates the valve plug, to modulate flow between the faucet inlet ports.

13. The faucet of claim 12, wherein:

the valve plug includes a forward stem; and the aft end of the piston defines an aft piston cavity that is fluidly separated from the forward piston cavity, and the stem of the valve plug extends into the aft piston cavity, wherein the aft piston cavity and the stem are shaped such that rotation of the piston rotates the valve plug.

14. The faucet of claim 13, wherein:

the valve plug defines a plug base and a plug body between the plug base and the stem, wherein the plug body is within the cartridge cavity, and defines an outer o-ring groove that faces the cartridge.

15. The faucet of claim 1, further comprising:

an aeration plug that is secured to the faucet outlet.

16. The faucet of claim 1, further comprising:

a bleed plug disposed within the aft wall that is fluidly coupled to the faucet inlet ports and removable from the aft wall to bleed the faucet inlet ports.

17. A faucet comprising:

a body, extending from a forward end to an aft end to define a body cavity, wherein the body includes an aft wall that defines faucet inlet ports, and the body defines a faucet outlet between the forward and aft ends;

a push knob, operationally coupled to the forward end of the body;

a cartridge, fixed within the body cavity, wherein the cartridge defines a cartridge cavity that has an aft seal seat, a cartridge outlet port that is forward of the aft seal seat, and a cartridge inlet port that is aft of the aft seal seat;

a piston that is seated within the cartridge cavity, the piston defining an aft seal lip, wherein:

the piston is movable by the push knob from a first position to a second position, to move the lip away from the seal seat and open the faucet; and the piston is movable by a spring from the second position to the first position, to position the lip against the aft seal seat and close the faucet; and a linear damper, mounted to the forward end of the body, wherein the linear damper engages the piston to dampen movement of the piston from the second position to the first position, wherein:

the aft end of the body includes:

a backplate; and forward and aft gaskets that are forward and aft of the backplate, wherein:

the backplate defines first and second apertures for receiving terminal ends of feed lines that are connected to the faucet inlet ports; and the backplate is mountable between the aft wall of the body and an exterior structure.

18. The faucet of claim 1, wherein the damper is a solenoid or mechanically adjustable.

19. The faucet of claim 1, further comprising:

an outer cover is secured to the body, the outer cover defines a cutout to position the outer cover around the faucet outlet.

* * * * *